United States Patent
Moloznik

(10) Patent No.: US 10,492,472 B1
(45) Date of Patent: Dec. 3, 2019

(54) PET CLEANUP SYSTEM

(71) Applicant: David Moloznik, Bryn Mawr, PA (US)

(72) Inventor: David Moloznik, Bryn Mawr, PA (US)

( * ) Notice: Subject to any disclaimer, the term of this patent is extended or adjusted under 35 U.S.C. 154(b) by 0 days.

(21) Appl. No.: 15/960,404

(22) Filed: Apr. 23, 2018

(51) Int. Cl.
*E01H 1/12* (2006.01)
*A01K 27/00* (2006.01)
*A01K 23/00* (2006.01)

(52) U.S. Cl.
CPC .......... *A01K 27/008* (2013.01); *A01K 23/005* (2013.01); *E01H 2001/128* (2013.01); *E01H 2001/1273* (2013.01); *E01H 2001/1286* (2013.01)

(58) Field of Classification Search
CPC .. A01K 23/005; A01K 27/003; A01K 27/008; E01H 2001/1273; E01H 2001/128; E01H 2001/1286
USPC .......................................................... 294/1.3
See application file for complete search history.

(56) References Cited

U.S. PATENT DOCUMENTS

| | | | | |
|---|---|---|---|---|
| 5,727,500 | A * | 3/1998 | Conboy | A01K 23/005 119/174 |
| 6,019,067 | A * | 2/2000 | Carey | A01K 27/006 119/795 |
| 6,085,695 | A * | 7/2000 | Miller | A01K 27/006 119/795 |
| 6,199,737 | B1 | 3/2001 | Ringelstetter | |
| 6,418,881 | B1 * | 7/2002 | Starratt | A01K 27/006 119/769 |
| 6,454,119 | B1 | 9/2002 | Demeur et al. | |
| 8,312,599 | B2 | 11/2012 | Vogl et al. | |
| 8,505,770 | B2 * | 8/2013 | Askinasi | A01K 23/00 119/174 |
| D727,577 | S * | 4/2015 | Lanich | D30/153 |
| 9,737,055 | B2 * | 8/2017 | Craig | A01K 27/008 |
| 9,861,078 | B1 | 1/2018 | Mantelli et al. | |
| 2002/0175197 | A1 * | 11/2002 | Cummins | A01K 27/006 224/675 |
| 2003/0111022 | A1 | 6/2003 | Woolley et al. | |
| 2006/0231043 | A1 | 10/2006 | Galdo | |
| 2008/0017121 | A1 | 1/2008 | Mauro | |

(Continued)

OTHER PUBLICATIONS (Author unknown), "Tuff Mutt", https://www.amazon.com/Tuff-Mutt-Attachment-Dispenser-Lightweight/dp/B01979RHTG, appeared on the web before the filing date of the current application.

(Continued)

*Primary Examiner* — Dean J Kramer
(74) *Attorney, Agent, or Firm* — Muskin and Farmer LLC

(57) ABSTRACT

A method and system to facilitate animal waste clean-up and temporary storage for transport to a waste receptacle. A container contains a bendable body which is attached to a mesh pouch. A filled waste bag can be inserted inside the mesh pouch, and the container can be rolled up into a compact device. The container is configured to slide along (both up and down) a leash used to walk the dog. Thus, the dog walker can fill a waste bag with solid waste from the dog, knot it, open the container, put the waste bag in the pouch, seal the container up, and then the container would (when filled with a waste bag) automatically slide down the leash towards the dog due to gravity. The dog walker can then continue walking the dog in a more dignified manner with the container conveniently attached to the leash.

20 Claims, 12 Drawing Sheets

(56) References Cited

U.S. PATENT DOCUMENTS

| | | | |
|---|---|---|---|
| 2008/0179902 A1* | 7/2008 | Phillips | E01H 1/1206 294/1.3 |
| 2009/0095225 A1* | 4/2009 | O'Connell | A01K 27/006 119/161 |
| 2009/0205585 A1 | 8/2009 | La Herran et al. | |
| 2009/0266853 A1 | 10/2009 | Bianchi | |
| 2010/0024741 A1 | 2/2010 | Schoppman | |
| 2010/0237640 A1 | 9/2010 | Chia | |
| 2012/0024925 A1 | 2/2012 | Caldeira et al. | |
| 2012/0167834 A1 | 7/2012 | Cummings et al. | |
| 2012/0286003 A1* | 11/2012 | Shadday | E01H 1/1206 224/191 |
| 2013/0081579 A1 | 4/2013 | Mclaughlin | |
| 2013/0125834 A1 | 5/2013 | Gee | |
| 2014/0069976 A1 | 3/2014 | Osher | |
| 2014/0131377 A1 | 5/2014 | Rogers | |
| 2014/0168951 A1 | 6/2014 | Briere | |
| 2015/0144072 A1* | 5/2015 | Whitefield | A01K 27/008 119/795 |
| 2015/0157104 A1* | 6/2015 | Jang | A01K 27/008 150/107 |
| 2015/0230431 A1 | 8/2015 | Patterson, Jr. | |
| 2015/0305310 A1 | 10/2015 | Roberdeaux | |
| 2015/0375933 A1* | 12/2015 | First | A45F 3/00 206/38 |
| 2016/0023807 A1 | 1/2016 | Tappan et al. | |
| 2016/0135432 A1 | 5/2016 | Cox | |
| 2017/0002531 A1 | 1/2017 | Byham | |
| 2018/0007868 A1 | 1/2018 | Knight | |

OTHER PUBLICATIONS (Author unknown), "Paw Lifestyles", https://www.amazon.com/dp/B01DN07JUM/ref=sspa_dk_detail_3?psc=1&pd_rd_i=B0lDN07JUM&pd_rd_wg=qshFK&pd_rd_r=AJWYSBNGBJC4V336VVG3&pd_rd_w=Fg8Ax, appeared on the web before the filing date of the current application.

(Author unknown), "PooVault", https://www.amazon.com/dp/B073XWP8GP/ref=sspa_dk_detail_1?psc=1, appeared on the web before the filing date of the current application.

(Author unknown), "TurdleBag", http://www.turdlebag.com, appeared on the web before the filing date of the current application.

(Author unknown), "The Fifth Paw", https://www.amazon.com/Fifth-Paw-Holder-Attachment-Tangerine/dp/B008C8LIK8/ref=sm_n_ma_dka_US_pr_snf_0_3?adId=B008C8LIK8&creativeASIN=B008C8LIK8&linkId=c94c879d30cad0c7413bc64ee2bd8bc9&tag=wwwmydoglikes-20&linkCode=w43&ref-refURL=https%3A%2F%2Fmydoglikes.com%2Fbusy-pet-parents%2F&slotNum=1&imprToken=efwQRNyxxbyOW7EAUFM3fA&adType=smart&adMode=manual&adFormat=grid&impressionTimestamp=1518741593669, appeared on the web before filing date of current application.

* cited by examiner

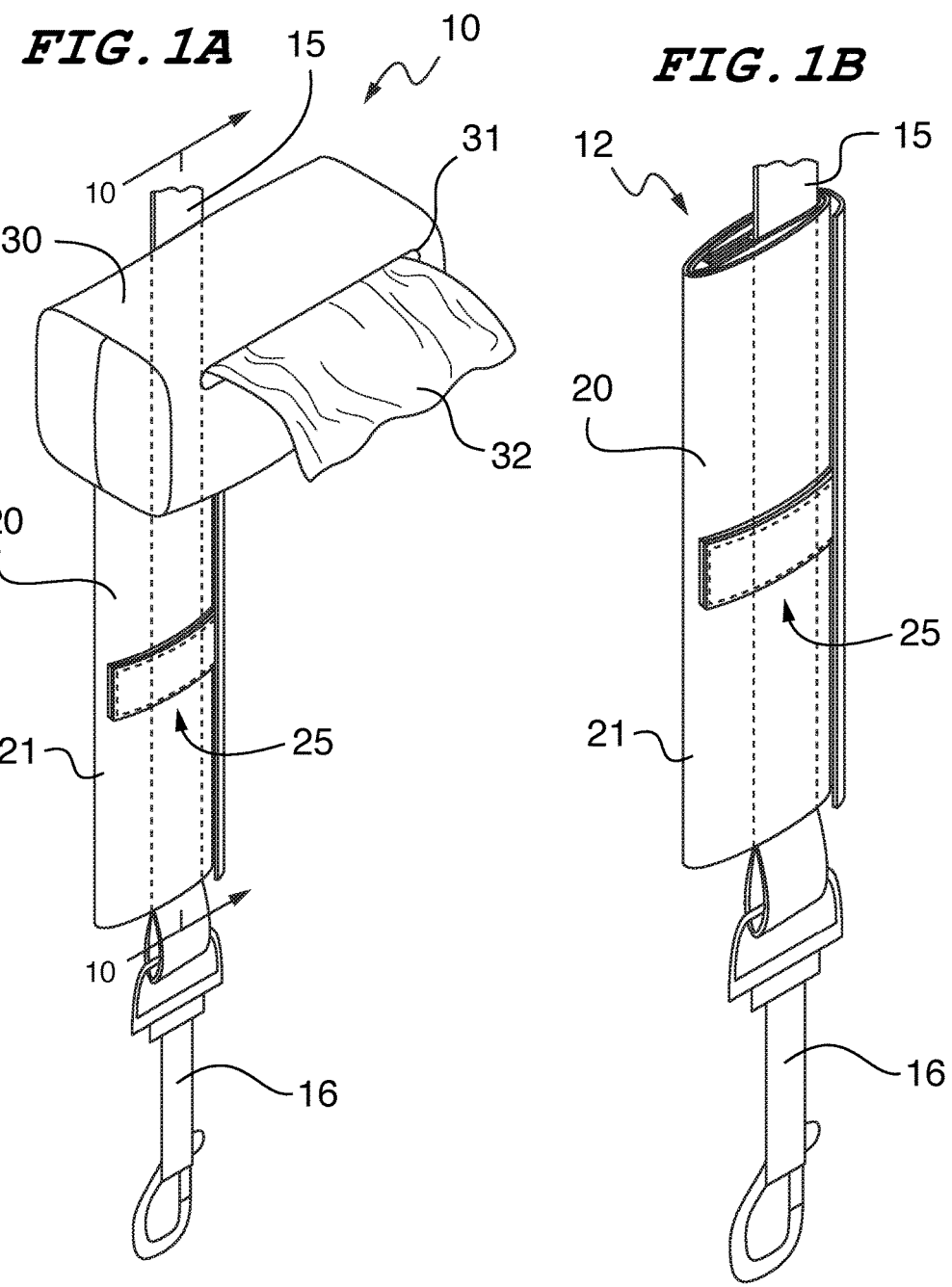

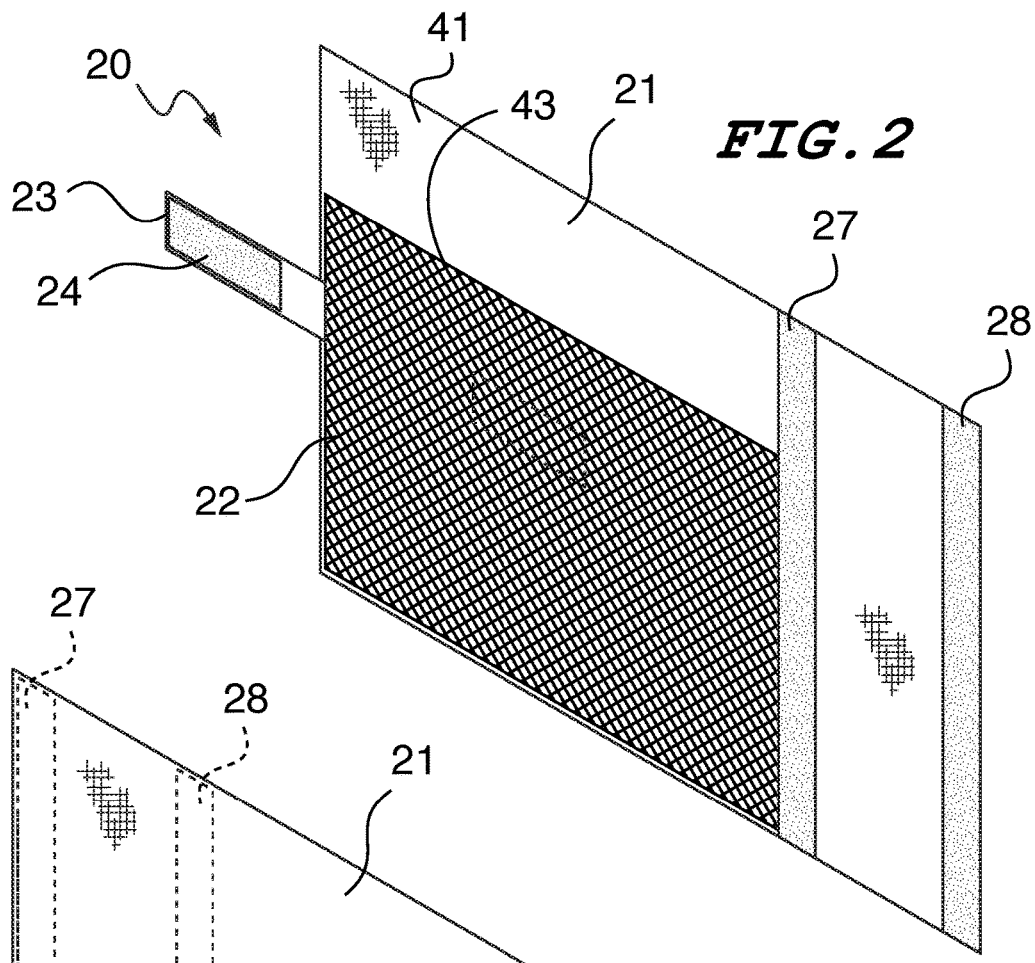
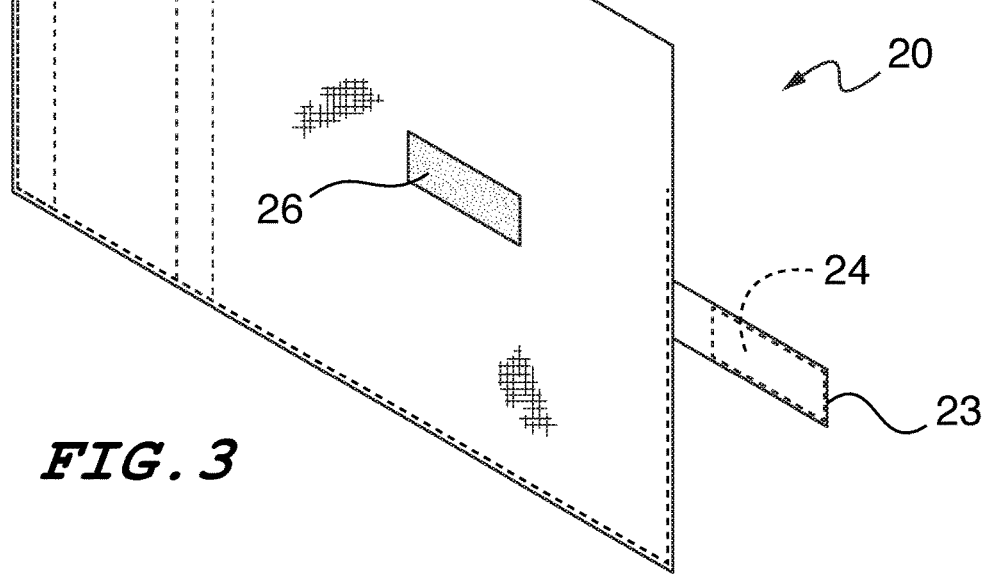

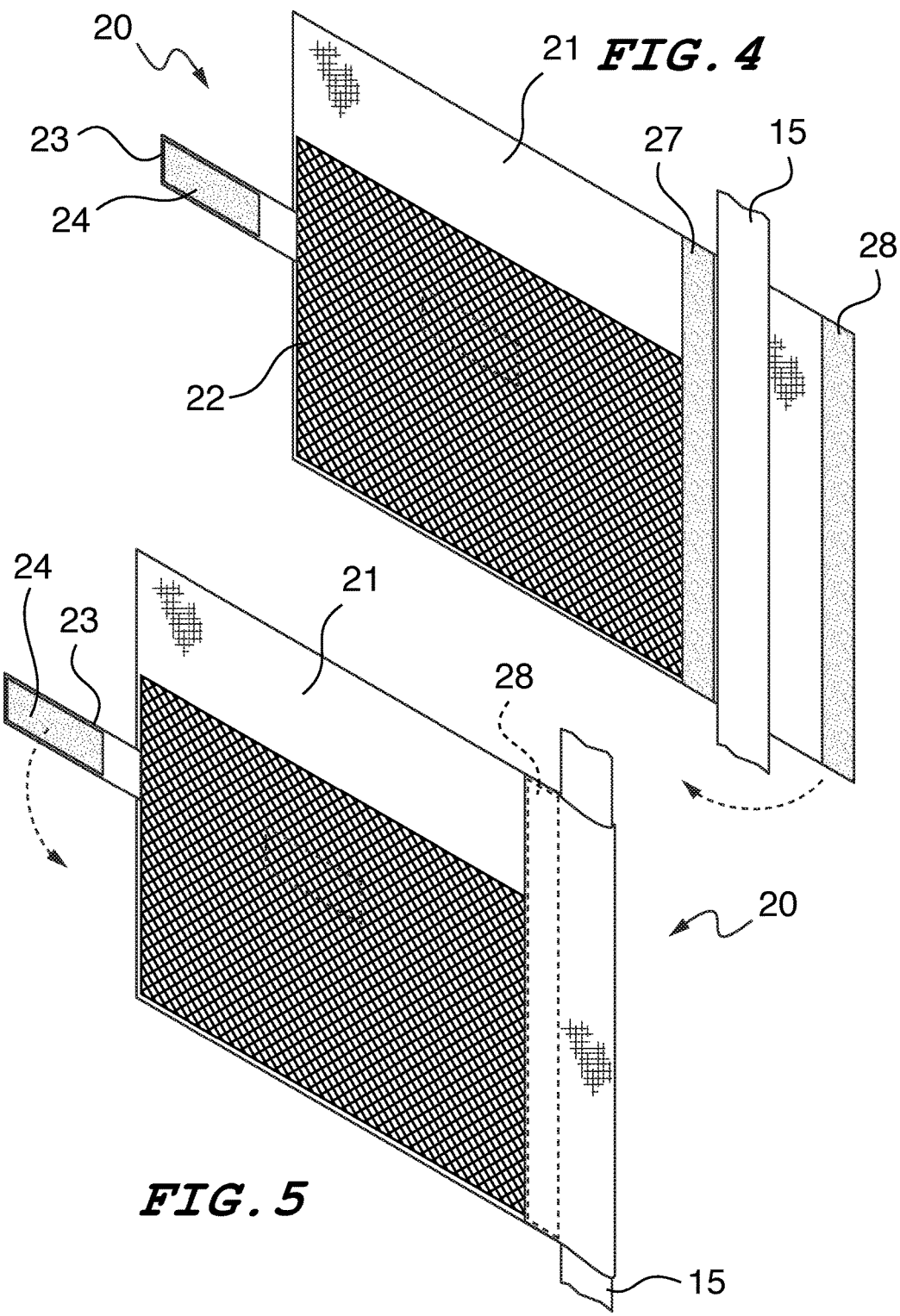

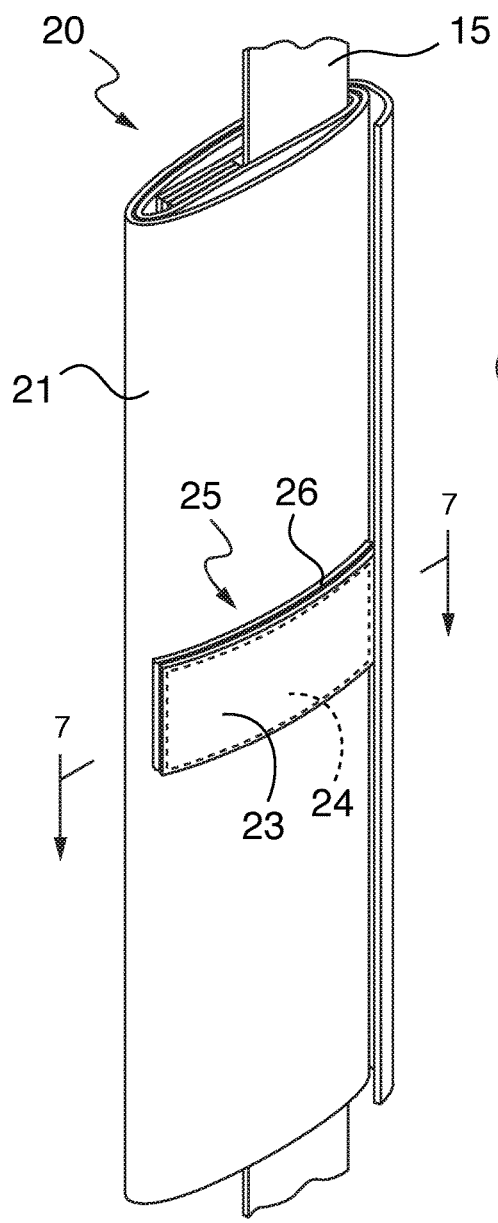
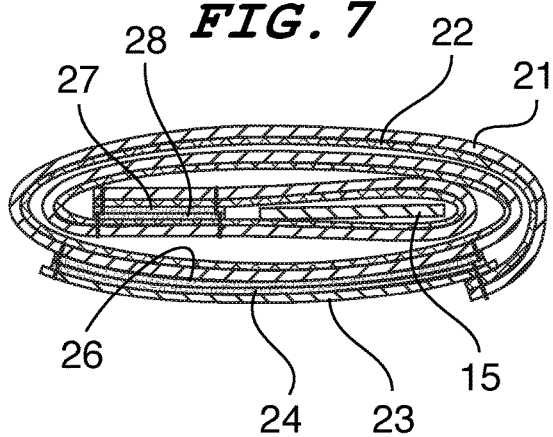
FIG. 6
FIG. 7

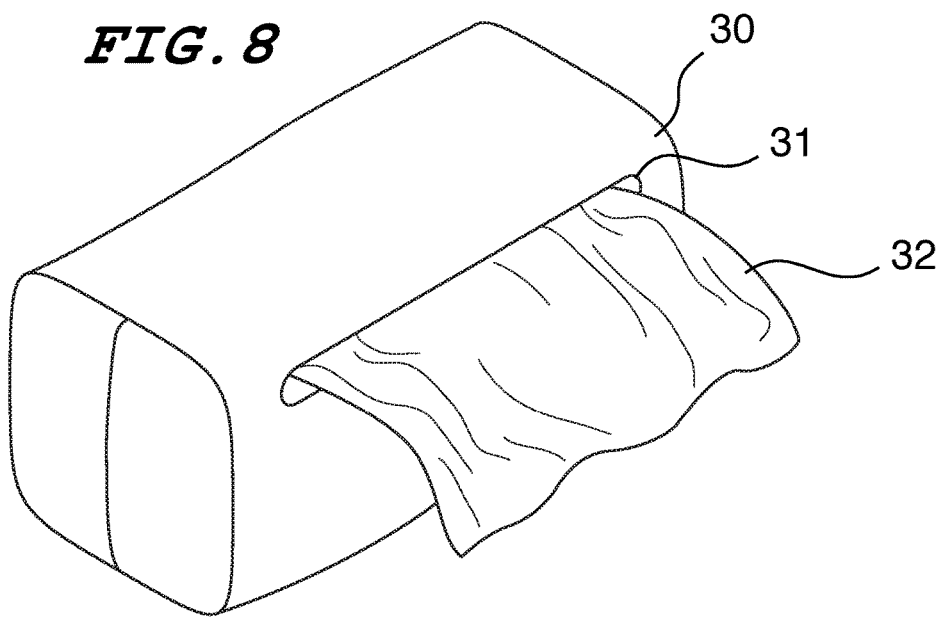
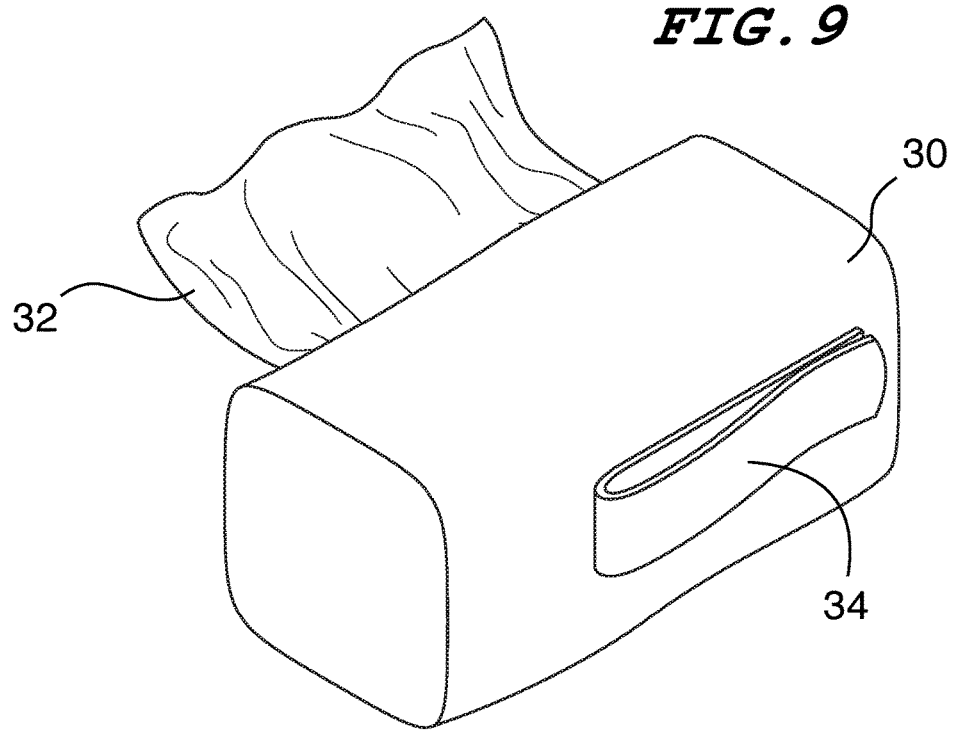

PET CLEANUP SYSTEM

BACKGROUND OF THE INVENTION

Field of the Invention

The present general inventive concept is directed to a method and apparatus for a pet waste cleanup and transport system.

Description of the Related Art

Dog owners are usually required by law to clean up any waste (typically solid waste) that the dog makes. Prior art systems are known for carrying bags and wrapping up waste and containing that waste. Dog owners say that one of the most unpleasant tasks about being a dog owner is having to clean up their pet's waste.

What is needed is an improved pet waste containment and transport system which is as easy and sanitary as possible for users.

SUMMARY OF THE INVENTION

It is an aspect of the present invention to provide an improved pet cleanup system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 1A is a drawing of a dog waste container attached to a leash with a dog waste bag dispenser, according to an embodiment;

FIG. 1B is a drawing of a dog waste container attached to a leash without a dog waste bag dispenser attached, according to an embodiment;

FIG. 2 is a drawing of an inside view of the dog waste container not attached to a leash, according to an embodiment;

FIG. 3 is a drawing of an outside view of an unattached dog waste container, according to an embodiment;

FIG. 4 is a drawing of a first step in attaching the dog waste container to a leash, according to an embodiment;

FIG. 5 is a drawing of a second step in attaching the dog waste container to a leash, according to an embodiment;

FIG. 6 is a drawing of the dog waste container which is empty attached to a leash, according to an embodiment;

FIG. 7 is a drawing of a horizontal cross section of the dog waste container attached to a leash from the view shown in FIG. 6, according to an embodiment;

FIG. 8 is a drawing of a front view of a waste bag dispenser, according to an embodiment;

FIG. 9 is a drawing of a rear view of the waste bag dispenser, according to an embodiment;

DESCRIPTION OF THE PREFERRED EMBODIMENTS

Figure 10:
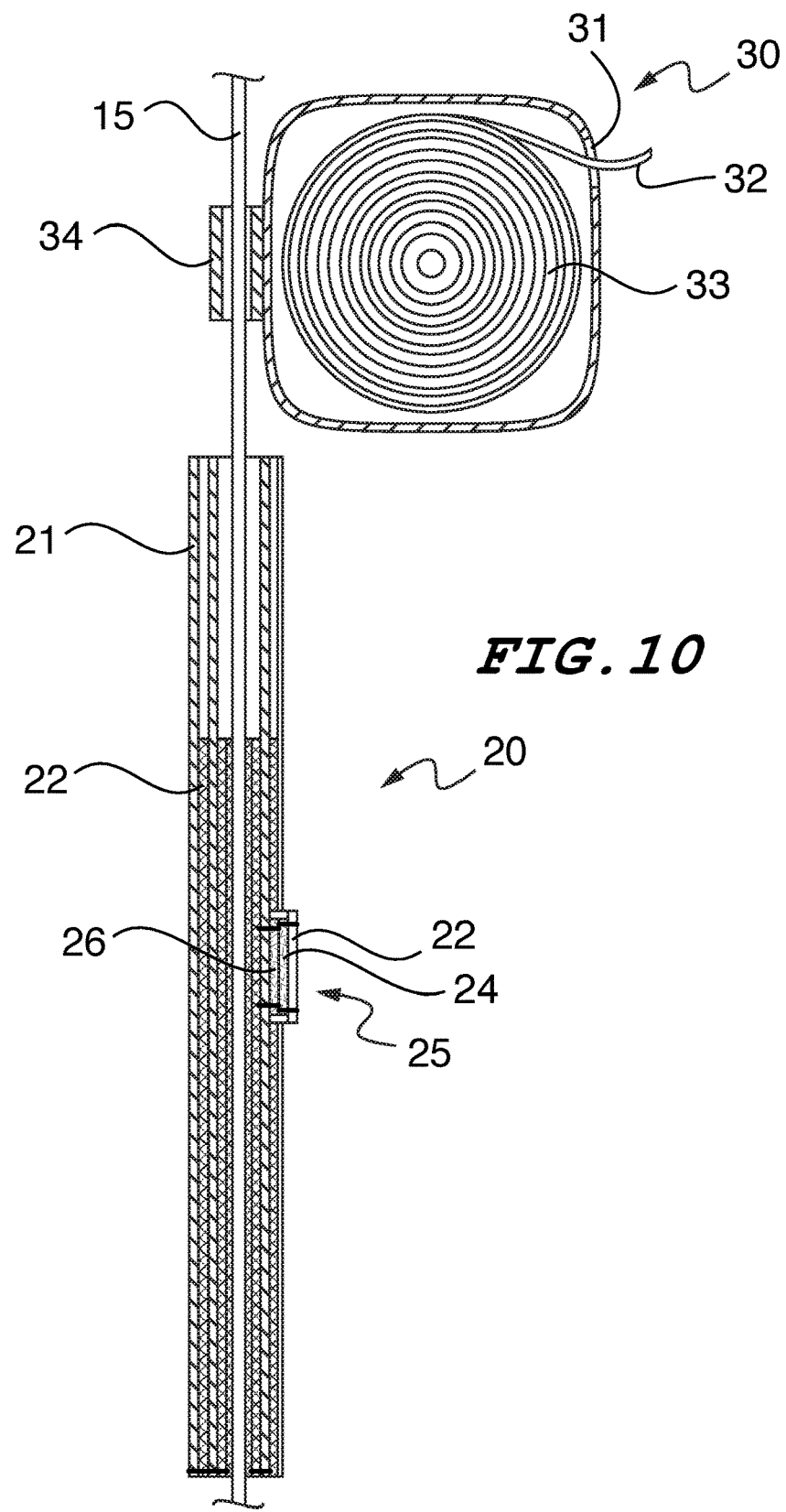
FIG. 10 is a drawing of a vertical cross section of the dog waste container which is empty and the waste bag dispenser from the view shown in FIG. 1A, according to an embodiment.

Reference will now be made in detail to the presently preferred embodiments of the invention, examples of which are illustrated in the accompanying drawings, wherein like reference numerals refer to like elements throughout.

The present general inventive concept is a portable waste container which fits and slides on a leash. Because the container fits on a leash, the dog (or other animal) walker does not need to carry or handle the container as it remains on the leash while the walker continues to walk his/her dog. The container can also have attached to it an optional dog waste bag dispenser. When it is time to collect dog waste, the walker can (slide the container to the top of the leash) take a bag out of the dog waste bag dispenser, collect the dog waste, and put the bag of dog waste (after it is sealed closed) inside the container (and then manually slide, or allow gravity to automatically, slide the container back down to the bottom of the leash). Note that instead of using the (optional) dispenser, clean (unused) waste bags can also be stored inside the container itself. The container can slide up and down on the leash, thereby freeing the walker from having to carry or handle the container. When the walker gets back home (or other location), the walker can open the container, remove the sealed bag of dog waste and discard the sealed bag of dog waste. The container (when secured on the leash) does not have to be near the walker's hands while the walker is walking a dog. When mounted on a leash, gravity can cause the container to slide down the leash. The container is in a compact package.

FIG. 1A is a drawing of a dog waste container attached to a leash with a dog waste bag dispenser, according to an embodiment.

Shown is a dog waste container with dispenser 10 (container 20 combined with dispenser 30), the dog waste container 20 being in a closed position. A closure mechanism 25 can comprise a Velcro closure tab 23 with a male Velcro pad 24 and a female Velcro pad 26 to which the male Velcro pad 24 can attach thereto in order to hold the container 20 closed. Note that the female Velcro pad 26 is affixed to the container body 21 and is exposed to an outside (externally) so that the male Velcro pad 24 can contact the female Velcro pad 26 in order to close (seal) the container 20 (as shown in FIG. 6).

The dog waste container 20 also comprises a dog waste container body 21 and an optional waste bag dispenser 30. The waste bag dispenser 30 has a dispenser opening 31 which dispenses waste bags (one waste bag 32 is shown ready for removal). Note that container body 21 (and any other material used herein) can be made of a malleable (foldable) material (for example canvas, neoprene, vinyl, plastic, nylon, etc.) which is able to bend and fold. This is true for the inner mesh pouch 22 and any other part of the container 20 that should bend in order that it folds up properly (see FIG. 1A). Note that in another embodiment the inner mesh pouch 22 does not have to be mesh (with holes throughout) and can be solid.

The dog waste container 20 is attached to a dog leash 15 which ends in a leash clasp 16.

FIG. 1B is a drawing of a dog waste container attached to a leash without a dog waste bag dispenser attached, according to an embodiment.

A dog waste container without dispenser 12 is shown, which is the same as illustrated in FIG. 1A but this embodiment does not contain the waste bag dispenser 30.

FIG. 2 is a drawing of an inside view of the dog waste container not attached to a leash, according to an embodiment.

The container 20 can be opened which exposes a mesh inner pouch 22 which can be used to store used (and filled) waste bag(s). The mesh inner pouch 22 is attached to the container 20 on the left, right and bottom ends of the mesh inner pouch 22 but the top 43 of the mesh inner pouch 22 is not attached thereby enabling items to be placed inside the mesh inner pouch 22 (see for example FIG. 11). The mesh inner pouch 22 can be waterproof and/or stretchable. The top 43 of the mesh inner pouch 22 is shorter than a top 41 of the body 21.

Also shown is the closure tab 23 (which can be elastic) and male Velcro pad 24 on an end of the closure tab 23. The male Velcro pad 24 attaches onto the female Velcro pad 26 in order to close the container 20. The container can be made in any size, for example 9 inches by 13 inches although any other dimensions can be used.

A female Velcro strip 27 cooperatively attaches to a male Velcro strip 28 which is used to secure the leash 15. In other words, when the female Velcro strip 27 is attached to the male Velcro strip 28, it forms a closed loop with the leash 15 inside (this is illustrated in FIGS. 4-5). The Velcro strips 27, 28 are attached to both the inner mesh pouch 22 and the body 21 so that the Velcro strips 27, 28 do not pull away from the body 21 in the manner that the inner mesh pouch 22 can (for example see FIG. 11).

FIG. 3 is a drawing of an outside view of an unattached dog waste container, according to an embodiment.

Shown is a dog waste container body 21. Also shown is the female Velcro pad 26 on the dog waste container body 21 which attaches to (receives) the male Velcro pad 24 on the closure tab 23. Note that anywhere Velcro is used herein, the male and female portions can be interchanged (e.g., male/female becomes female/male). Note that any other attachment mechanism can be used as well (e.g., snap/snap receiver, hook/loop, button/hole, etc.) in place of any Velcro attaching parts as described herein. Note that all of these attachment mechanisms (e.g., Velcro, snaps, hook/loop, button/hole, etc.) would allow easy and repeated attachment and detachment with no limit (until such parts may wear out which is unlikely).

FIG. 4 is a drawing of a first step in attaching the dog waste container to a leash, according to an embodiment.

The leash 15 is inserted between the female Velcro strip 27 and the male Velcro strip 28 (of course the male and female materials can be reversed).

FIG. 5 is a drawing of a second step in attaching the dog waste container to a leash, according to an embodiment.

After the leash 15 is inserted between the Velcro strips 27, 28, the male Velcro strip 28 is folded over the leash 15 and secured onto the female Velcro strip 27. This forms a loop with the leash 15 therebetween. Note that the tightness of the fit can be adjusted by connecting the male Velcro strip 28 to various portions of the female Velcro strip 27 (e.g., attaching male Velcro strip 28 to the farthest portion possible on female Velcro strip 27 would result in the tightest fit, while attaching male Velcro strip 28 to the closest portion possible on female Velcro strip 27 would result in the loosest fit).

Figure 14:
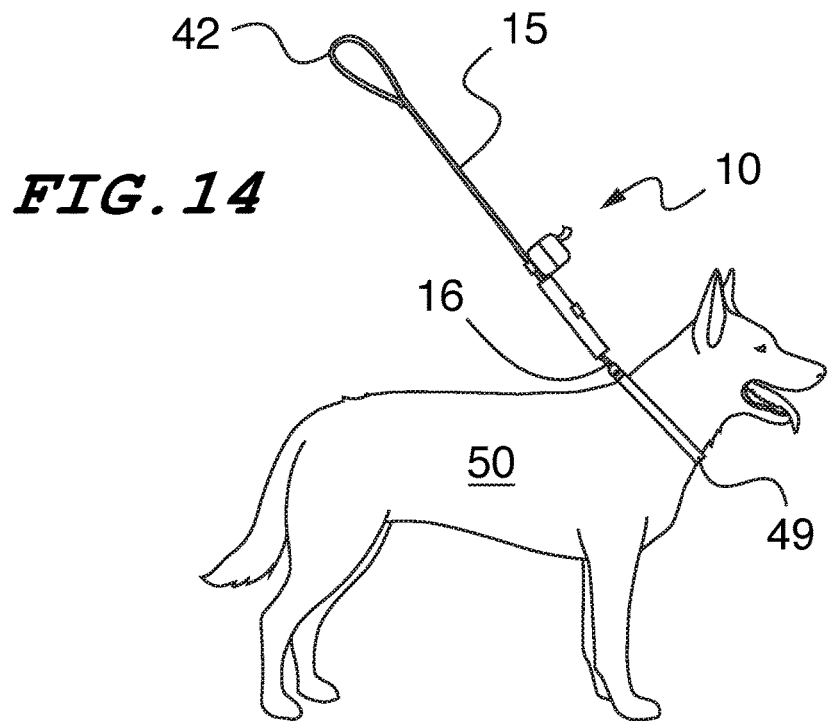
FIG. 14 is a drawing showing a lowered closed empty waste container attached to a leash, according to an embodiment.
Figure 18:
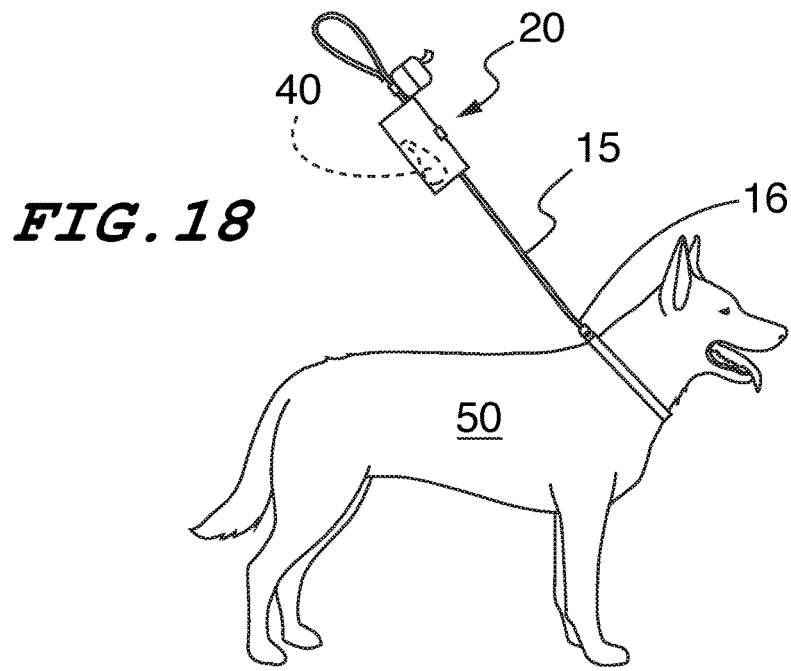
FIG. 18 is a drawing showing a raised closed full waste container attached to a leash, according to an embodiment.

The fit should ideally be adjusted so that once the container 20 is placed on the leash, one of the following cases (at the walker's preference) is satisfied: 1) the container 20 (by itself or with the optional waste bag dispenser 30) would be secured on the leash 15 and would not slide in either direction; 2) the container 20 (by itself or with the optional waste bag dispenser 30) would remain stationary on the leash (e.g., due to friction or other forces) but would slide up and down the leash 15 when the walker physically moves the container 20 up and down on the leash 15 (in other words, the walker can position the container 20 anywhere on the leash 15 that the walker desires); 3) the container 20 (by itself or with the optional waste bag dispenser 30) would automatically slide down the leash due to gravity and would stop at the bottom of the leash (see FIGS. 14 and 18).

Note that there are different standard size thicknesses of leashes. For example, some standard leash thicknesses are one inch, ⅜ inch, and a cable (other sizes can exist as well). The container 20 can come in different versions, each sized for a particular size leash. The gap between the Velcro strips 27, 28 can be increased or decreased to accommodate (fit) a particular thickness of leash so that the fit of the loop (when Velcro strips 27, 28 are attached) around the leash is snug yet allows for sliding as described herein. The thickness of the Velcro strips 27, 28 can also be adjusted. In an embodiment, the Velcro strips can be wide 27, 28 (e.g., one inch or greater) so that the user (walker) can attach the two velcro strips 27, 28 at a particular distance in order to adjust the gap between the Velcro strips to securely fit a particular leash size.

Note that in a further embodiment, the Velcro strips 27, 28 are not required and instead a loop (with opening therein) can be created by stitching an end of the container body 21 to itself. This would look like FIG. 5 but instead of where the Velcro 28 is shown, there would be permanent stitching down the container body 21 (to itself) to form the loop with opening that the leash could be put through. In this embodiment, an end of the leash (either the handle or the clasp) would have to fit through the opening in the loop because the loop would not open. Another way to describe this embodiment is instead of Velcro strips 27, 28 (which can be removed and reattached), these sections would just be permanently attached to each other (via stitching or other attachment mechanism). Besides this physical difference this embodiment would otherwise operate the same as the other embodiments described herein.

FIG. 6 is a drawing of the dog waste container which is empty attached to a leash, according to an embodiment.

The leash 15 is inside the loop created between the female Velcro strip 27 and the male Velcro strip 28. In an embodiment, the container 20 can slide up and down the leash 15 as the fit around the leash 15 is not overly tight. In another embodiment, the container 20 would not be able to slide (in either direction) because the fit around the leash 15 would be very tight. The closure mechanism 25 keeps the container 20 closed. Note that the closure mechanism 25 can be any type of closure structure (e.g., button/hole, snap/snap receiver, hook/loop, etc.) Ideally, the closure mechanism 25 should seal the container 20 tight (securely). Note that filled waste bags can be malleable which allows the container 20 to bend and roll up.

FIG. 7 is a drawing of a horizontal cross section of the dog waste container attached to a leash from the view shown in FIG. 6, according to an embodiment.

As can be seen, all of the parts of the container 20 are folded up into a compact package.

FIG. 8 is a drawing of a front view of a waste bag dispenser, according to an embodiment.

The waste bag dispenser 30 has an opening 31 (e.g., a slit) which dispenses waste bags stored inside the dispenser 30 including waste bag 32.

FIG. 9 is a drawing of a rear view of the waste bag dispenser, according to an embodiment.

Shown is a clip 34 attached to a side of the dispenser 30 which can be used to clip the container 20 onto the leash 15 (see FIG. 13) or onto the dispenser 30. Instead of a clip 34, any other attachment mechanism can be used to attach the dispenser 30 to the container 20 or the leash 15, such as Velcro, stitching, snaps, etc. In an embodiment, the dispenser 30 can be permanently attached to the container 20 via stitching which stitches the two parts together.

FIG. 10 is a drawing of a vertical cross section of the dog waste container which is empty and the waste bag dispenser from the view shown in FIG. 1A, according to an embodiment.

The dispenser 30 is attached to the leash 15 via clip 34 or any other attachment mechanism. A roll of waste bags 33 ends with a single waste bag 32 which protrudes out of the opening 31. In this embodiment, the dispenser 30 is not attached to the container 20 and if the container 20 slides down the leash 15 the dispenser 30 would remain fixed on the leash 15. However, in another embodiment, the dispenser 30 can be attached (e.g., clipped or other attachment mechanism) to the leash 15 so that the dispenser 30 would slide along the leash 15 with the container 20. Note that the dispenser 30 can also be used as a handle (in the embodiment where the dispenser 30 is attached to the container) in order to grasp when sliding the container 30 up and down the leash 15.

Figure 11:
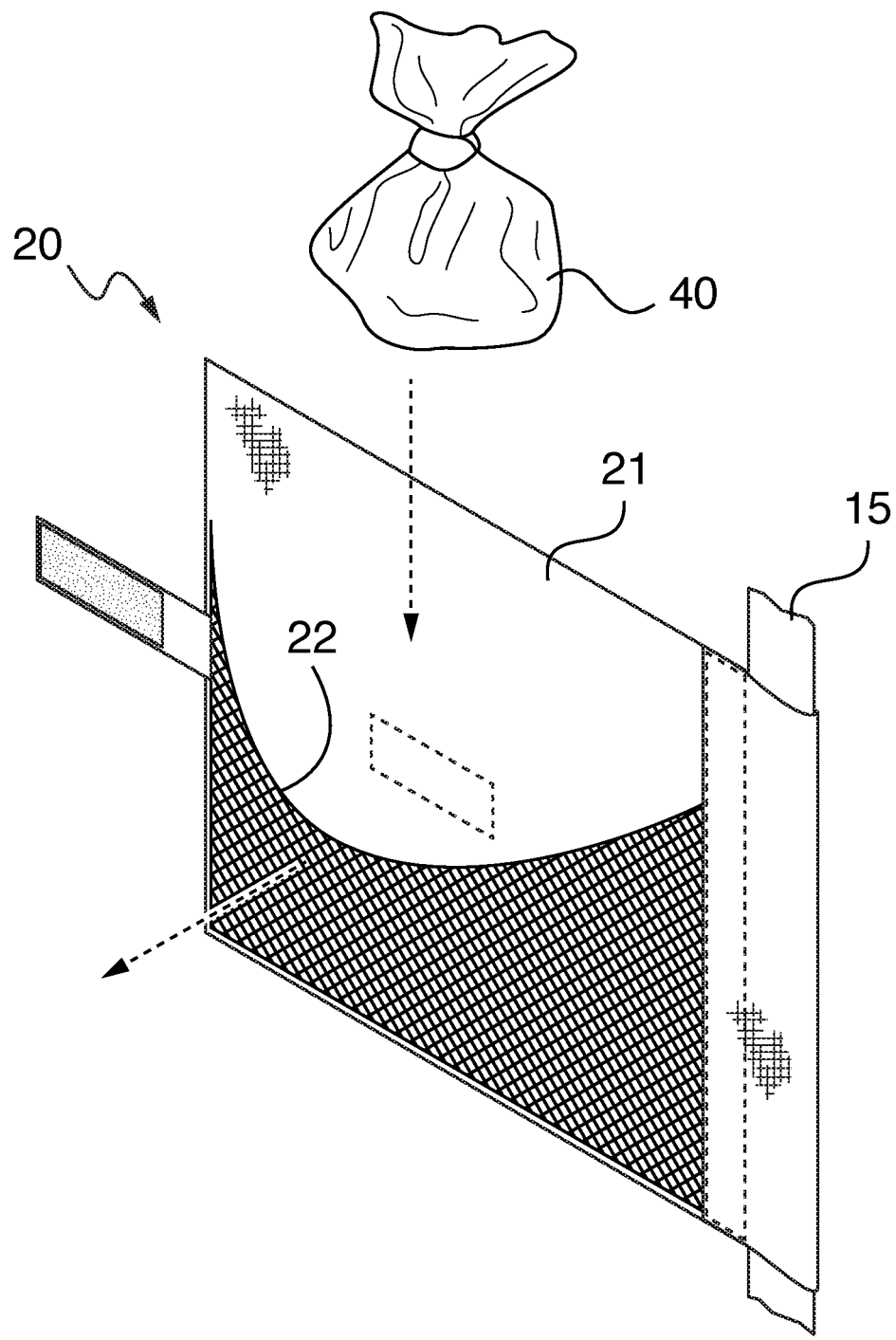
FIG. 11 is a drawing of an open dog waste container attached to a leash with a closed waste bag being inserted, according to an embodiment.

FIG. 11 is a drawing of an open dog waste container attached to a leash with a closed waste bag being inserted, according to an embodiment.

A filled waste bag 40 (filled with solid waste from a dog) is knotted shut and inserted into the mesh inner pouch 22 inside the container 20. The container 20 can then be closed shut via the closure mechanism 25 (e.g., by wrapping the body 21 around the filled waste bag 40 and then attaching the male Velcro pad 24 located on the closure tab 23 to the female Velcro pad 26. Filled waste bag 40 can originally be a waste bag 32 which has been removed by the walker from the dispenser 30 and filled with dog (or any other type of) waste. Note that typically, the filled waste bag 40 will be inserted into the container 20 (as illustrated in FIG. 11) while the container is in the raised position on the leash (for example see FIG. 18), although the filled waste bag 40 can be inserted into the container 20 when the container is in any position along the leash as well.

Figure 12:
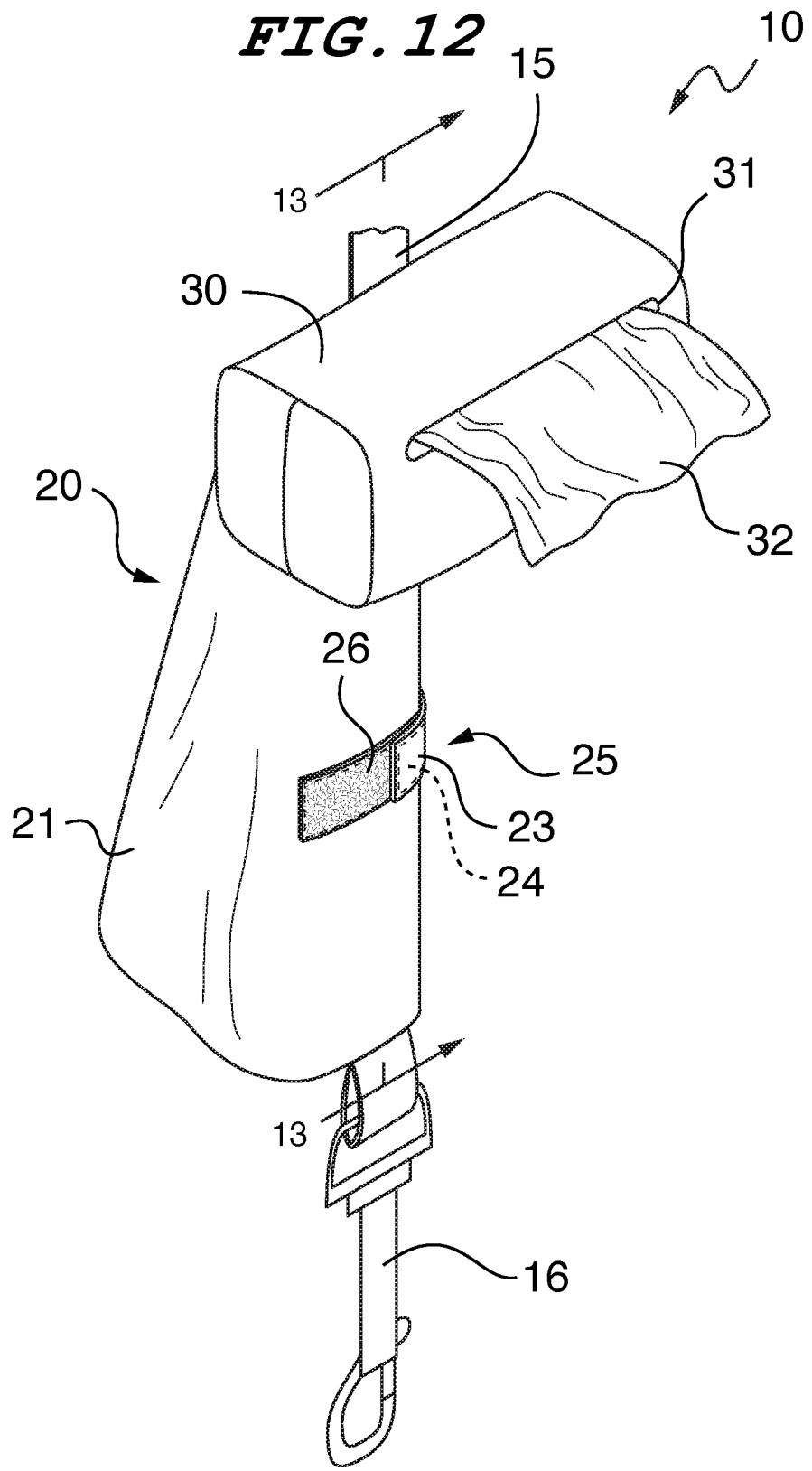
FIG. 12 is a drawing of a closed filled dog waste container attached to a leash with an attached waste bag dispenser, according to an embodiment.

FIG. 12 is a drawing of a closed filled dog waste container attached to a leash with an attached waste bag dispenser, according to an embodiment.

Illustrated is the container 20 after the filled waste bag 40 is inserted into the mesh inner pouch 22 and the container 20 is sealed shut. Here, the container 20 has dropped to the bottom of the leash 15, after being filled with with a filled waste bag 40.

Figure 13:
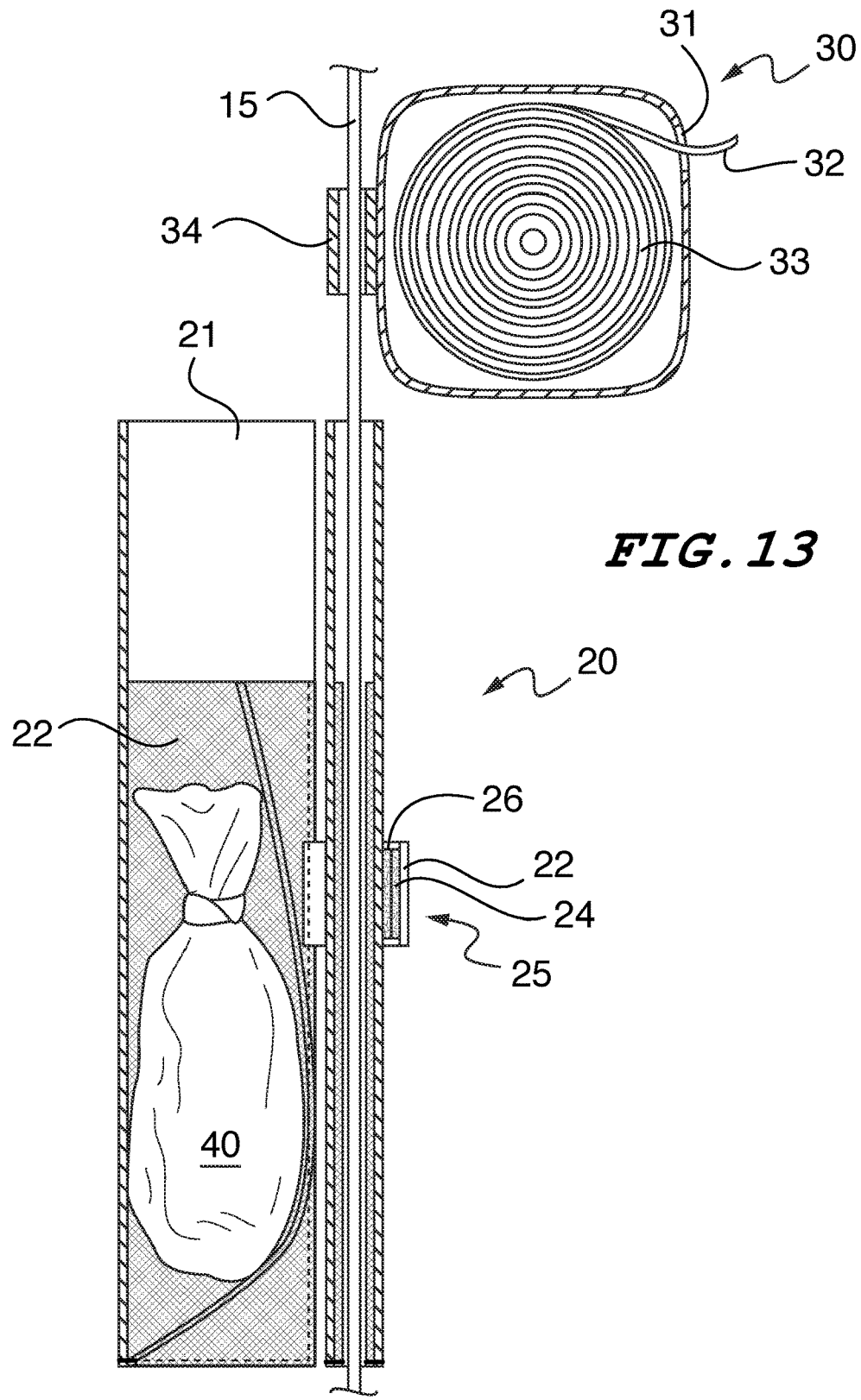
FIG. 13 is a drawing of a vertical cross section of the dog waste container which is full and the waste bag dispenser from the view shown in FIG. 12, according to an embodiment.

FIG. 13 is a drawing of a vertical cross section of the dog waste container which is full and the waste bag dispenser from the view shown in FIG. 12, according to an embodiment.

The filled waste bag 40 is secured inside the mesh inner pouch 22 inside the container 20. Since the filled waste bag 40 is knotted shut, no odors should escape from the filled waste bag 40.

FIGS. 14 to 19 illustrate a time sequence of usage of an embodiment of the present inventive concept. Of course, this is just one example, and other usages can be utilized as well.

FIG. 14 is a drawing showing a lowered closed empty waste container attached to a leash, according to an embodiment.

Note the leash 15 has a handle 42 on one end (used by the walker to hold the leash 15 when walking the dog 50) and the leash clasp 16 on the opposite end of the leash 15. The leash clasp 16 would attach to the dog's 50 collar 49.

In a first step, the container with dispenser 10 is on a bottom of the leash 15. When the container 20 with dispenser 10 slide to the end of the leash 15, it can be automatically stopped by the leash clasp 16. The walker can walk the dog in this position (or in the raised position as well illustrated in FIG. 15).

In an embodiment, the container 20 (and optionally the dispenser) 10 would be configured such that (e.g., including the tightness of the loop around the leash between Velcro strips 27, 27) to automatically slide down to the bottom of the leash 15 due to the force of gravity only when the container 20 contains a filled bag 40 (because the container 20 would be heavier) and would not slide down the leash 15 when the container does not contain a filled bag 40. In another embodiment, the container 20 would always automatically slide to the bottom of the leash 15 due to gravity regardless of the container's 20 contents. In a further embodiment, the container 20 would remain stationary on the leash 15 and would only slide (up or down) when manually slided by the walker. Note that manually sliding the container 20 up would require the walker to manually slide the container 20 all of the way up the leash 15. However, manually sliding the leash container 20 down could mean one of two things: a) manually sliding the container 20 all of the way down the leash 15; 2) giving the container a "push" downwards, and once pushed, the container 20 would then automatically slide all of the way down to the bottom of the leash 15. Note that in an embodiment, the walker can walk the dog with the container 20 in the raised position as well (either with or without a full waste bag 40).

Assume that the dog has now relieved itself with solid waste.

Figure 15:
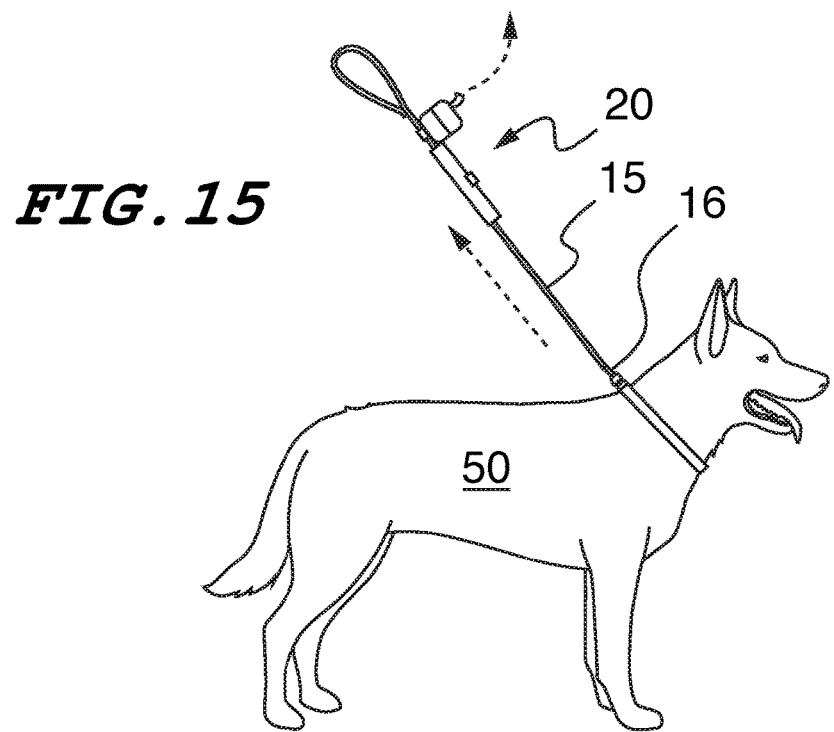
FIG. 15 is a drawing showing a raised closed empty waste container attached to a leash, according to an embodiment.

FIG. 15 is a drawing showing a raised closed empty waste container attached to a leash, according to an embodiment.

Figure 16:
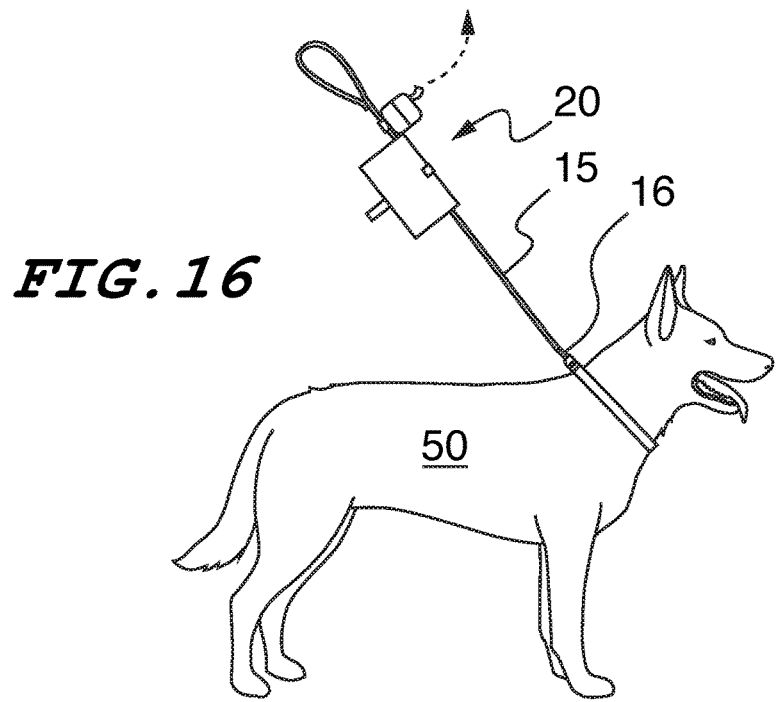
FIG. 16 is a drawing showing a raised open empty waste container attached to a leash, according to an embodiment.
Figure 17:
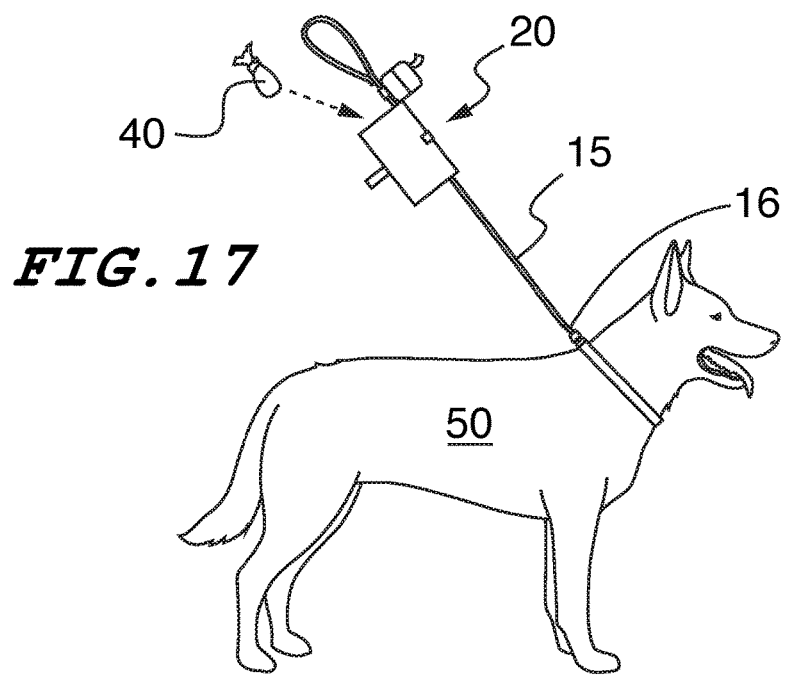
FIG. 17 is a drawing showing the insertion of a full waste container into the raised open empty waste container, according to an embodiment.

The walker manually raises (slides) the container with dispenser 10 up the leash 15. The walker takes out a waste bag 32 from the dispenser 30 (or alternatively takes a waste bag 32 out of the container 20 when the container 20 open as illustrated in FIG. 16 or alternatively from the walker's pocket). The walker then cleans up the solid dog waste and inserts it into the waste bag 32 and knots it, forming a filled (typically malleable) waste bag 40. The walker now opens the container 20 (e.g., by pulling the closure tab 23 off the female Velcro pad 26.

FIG. 16 is a drawing showing a raised open empty waste container attached to a leash, according to an embodiment.

The container is now shown open and a full waste bag 40 can be inserted therein.

FIG. 18 is a drawing showing a raised closed full waste container attached to a leash, according to an embodiment.

Figure 19:
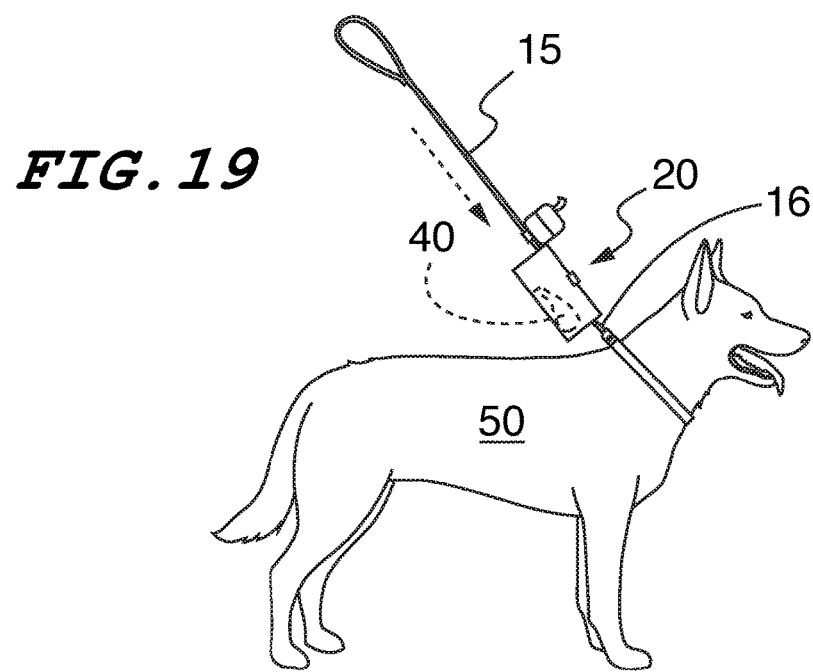
FIG. 19 is a drawing showing a lowered closed full waste container attached to a leash, according to an embodiment.

The walker has now closed the container 20 with the filled bag 40 inside the container 20. FIG. 19 is a drawing showing a lowered closed full waste container attached to a leash, according to an embodiment.

The container 20 now slides (either automatically due to gravity or manually by the walker) down the leash 15 to the bottom ("walking dog") position. The walker can now continue walking the dog 50 with the filled bag 40 secured and hidden inside the container 20. In this position, the walker is in a more "dignified" posture as the walker does not have the filled waste bag 40 near him/her and does also not have to touch or carry the filled waste bag 40 (since it is in the container 20 which is attached to the leash 15).

Thus, the inventive concept described herein frees the walker from having to use his/her own pockets to store a filled bag or carry a separate containing device to place a filled bag into. When the walker returns home (or is near a trash basket), the walker can simply open the container 20 and dispose of the filled bag 40 inside the trash basket, close the container 20 and continue walking the dog 50.

All Velcro connections herein are configured continuously attach and detach with no limitation. Velcro attachments which are described as male/female can be reversed to female/male, and vice-versa. Other attachment structures can be used instead of Velcro, including button/hole, snap/snap receiver, hook/loop, etc. What is important is that whatever is used in place of Velcro and repeatedly and easily attach and detach (in the same easy manner as Velcro can). In all embodiments described herein, the (optional) dispenser 30 may or may not be present and the functionality of the container 20 (including its sliding functionality) remains the same as described herein whether the dispenser 30 is present or not.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
a bendable container body;
a first Velcro strip on the container body;
a second Velcro strip on a same side of the container body and parallel to the first Velcro strip with a gap between the first Velcro strip and the second Velcro strip, the first Velcro strip and the second Velcro strip aligned in a first direction with the second Velcro strip not located along a line extending from the first Velcro strip; and
an inner pouch attached to the container body;
wherein the bendable container body is configured to fold from a flat position to a rolled up position in a second direction perpendicular to the first direction,
wherein the first Velcro strip and the second Velcro strip are configured such that the first Velcro strip attaches to the second Velcro strip thereby forming a loop.

2. The apparatus as recited in claim 1, further comprising a leash passing between the loop.

3. The apparatus as recited in claim 2, wherein the loop is configured such that the container body can slide along the leash.

4. The apparatus as recited in claim 2, wherein the loop is configured such that the container body would slide down the leash automatically due to gravity when the leash is held at an angle towards a ground.

5. The apparatus as recited in claim 1, further comprising a closure mechanism attached to the container body, the closure mechanism comprising a closure tab with an initial Velcro pad, the closure tab attached to the container body, and a secondary Velcro pad located on the container body, wherein the initial Velcro pad and the secondary Velcro pad configured to attach to each-other.

6. The apparatus as recited in claim 1, wherein a left side of the inner pouch is attached to the container body, a right side of the inner pouch is attached to the container body, and a bottom of the inner pouch is attached to the container body, a top side of the inner pouch is not attached to the container body, the inner pouch being configured to hold articles placed in the inner pouch through the top side of the inner pouch and the container body.

7. The apparatus as recited in claim 6, wherein the inner pouch is shorter in height than the container body so that the top side of the inner pouch is lower than a top side of the container body.

8. The apparatus as recited in claim 1, further comprising a waste bag dispenser.

9. The apparatus as recited in claim 8, wherein the waste bag dispenser is attached to the container body.

10. The apparatus as recited in claim 9, wherein the waste bag dispenser is attached to the container body using a clip.

11. The apparatus as recited in claim 1, wherein the inner pouch is made of a mesh material.

12. A method, comprising:
providing a container comprising a bendable container body; a first Velcro strip on the container body; a second Velcro strip on a same side of the container body and parallel to the first Velcro strip with a gap between the first Velcro strip and the second Velcro strip, the first Velcro strip and the second Velcro strip aligned in a first direction with the second Velcro strip not located along a line extending from the first Velcro strip; an inner pouch attached to the container body; and a closure mechanism attached to the container body wherein the bendable container body is configured to fold from a flat position to a rolled up position in a second direction perpendicular to the first direction;
providing a leash with a handle on a first end of the leash and a leash clasp on a second end of the leash opposite the first end;
placing a leash between the first Velcro strip and the second Velcro strip;
attaching the first Velcro strip to the second Velcro strip thereby forming a loop with the leash therebetween;
closing the container; and sliding the container up or down along the leash, wherein the leash clasp is attached to a dog's collar.

13. The method as recited in claim 12, wherein the container automatically slides down the leash due to the force of gravity.

14. The method as recited in claim 13, wherein the container stops sliding down the leash when the container comes into contact with the leash clasp.

15. The method as recited in claim 12, further comprising:
sliding the container up along the leash;
opening the container;
place a waste bag inside the inner pouch;
closing the container; and
sliding the container down along the leash.

16. An apparatus, comprising:
a bendable container body;
a first Velcro strip on the container body;
a second Velcro strip on a same side of the container body and parallel to the first Velcro strip with a gap between the first Velcro strip and the second Velcro strip, the first Velcro strip and the second Velcro strip aligned in a first direction with the second Velcro strip not located along a line extending from the first Velcro strip;
a loop formed by the container body with the first Velcro strip attached to the second Velcro strip with an opening therebetween configured to receive a leash,
an inner pouch attached to the container body; and
a closure mechanism attached to the container body,
wherein the bendable container body is configured to fold from a flat position to a rolled up position in a second direction perpendicular to the first direction.

17. The apparatus as recited in claim 16, further comprising a leash passing between the loop.

18. The apparatus as recited in claim 17, wherein the loop is configured such that the container body can slide along the leash.

19. The apparatus as recited in claim 17, wherein the loop is configured such that the container body would slide down the leash automatically due to gravity when the leash is held at an angle towards a ground.

20. The apparatus as recited in claim 16, further comprising a waste bag dispenser.

* * * * *